United States Patent [19]

Virsen

[11] 4,288,937
[45] Sep. 15, 1981

[54] DISPLAY STRUCTURE

[76] Inventor: Gary R. Virsen, Rte. 2, Box 42, Rogers, Minn. 55374

[21] Appl. No.: 88,189

[22] Filed: Oct. 25, 1979

Related U.S. Application Data

[63] Continuation-in-part of Ser. No. 936,723, Aug. 25, 1978, Pat. No. 4,214,392.

[51] Int. Cl.³ .............................................. G09F 7/00
[52] U.S. Cl. ........................................ 40/605; 40/607; 40/610; 211/182; 211/199; 248/163; 403/191; 403/235
[58] Field of Search ............... 40/605, 606, 607, 610, 40/611, 617, 624, 152.1, 155; 248/159, 163, 423, 432; 211/163, 165, 182, 189, 199; 160/135, 351; 403/233, 234, 235, 191

[56] References Cited

U.S. PATENT DOCUMENTS

| 958,082 | 5/1910 | Bland | 40/155 |
|---|---|---|---|
| 2,206,774 | 7/1940 | Hallowell | 248/163 |
| 2,790,258 | 4/1957 | Freshour | 40/605 X |
| 2,865,124 | 12/1958 | Mortellito | 40/605 |
| 2,970,396 | 2/1961 | Worrell | 40/605 |
| 3,094,802 | 6/1963 | Perry | 40/610 |
| 3,174,629 | 3/1965 | Gelberg et al. | 40/610 X |
| 3,236,481 | 2/1966 | Howard | 40/606 X |
| 3,428,108 | 2/1969 | Singer | 160/135 |
| 3,537,199 | 11/1970 | Lawson | 160/229 |
| 3,608,221 | 9/1971 | Harris | 160/135 X |
| 3,685,666 | 8/1972 | Rose | 211/178 |
| 3,935,653 | 2/1976 | Klein | 40/606 |
| 3,938,772 | 2/1976 | Andrusiak | 40/155 |
| 3,952,453 | 4/1976 | Amburgey | 403/233 X |
| 3,975,850 | 8/1976 | Giaume | 160/135 X |
| 4,030,219 | 6/1977 | Donovan | 160/135 X |
| 4,053,140 | 10/1977 | Clemens et al. | 403/233 X |
| 4,068,398 | 1/1978 | Parisi | 40/607 |
| 4,108,316 | 8/1968 | Slater | 40/610 X |
| 4,214,392 | 7/1980 | Virsen | 40/605 |

FOREIGN PATENT DOCUMENTS

| 2222924 | 10/1974 | France | 40/610 |
|---|---|---|---|
| 582927 | 12/1976 | Switzerland | 40/606 |
| 1320229 | 6/1973 | United Kingdom | 40/606 |

*Primary Examiner*—F. Barry Shay
*Assistant Examiner*—G. Lee Skillington
*Attorney, Agent, or Firm*—Merchant, Gould, Smith, Edell, Welter & Schmidt

[57] ABSTRACT

A plurality of generally rectangular frames (21) releasably hinged together and having display panels (36) mounted in display areas defined by the frames. Each frame is of tubular metal of rectangular cross section and includes a horizontal top frame member (19), having downturned end portions, and a U-shaped bottom frame member (21), having laterally spaced vertical tubular side frame portions with longitudinal slots. Connector pins (26) make sliding connection between the top frame member and the bottom frame member. Display panels in the display areas are formed with laterally projecting mounting tabs (37) that are received in the slots of the side frame members, and of the connection pins if necessary, to hold the panels in place. Supporting legs (15), which may also be of tubular material, have pivoting yokes (32) at their upper ends that slidingly engage the bottom frame portions of the frames, and clamping elements (39) releasably lock the bottom frame portions against sliding movements in the yokes: for table mounting, simple nonpivoting supports (142) are provided. Lighting fixtures (121) are slidably secured to the tops of the frames.

2 Claims, 18 Drawing Figures

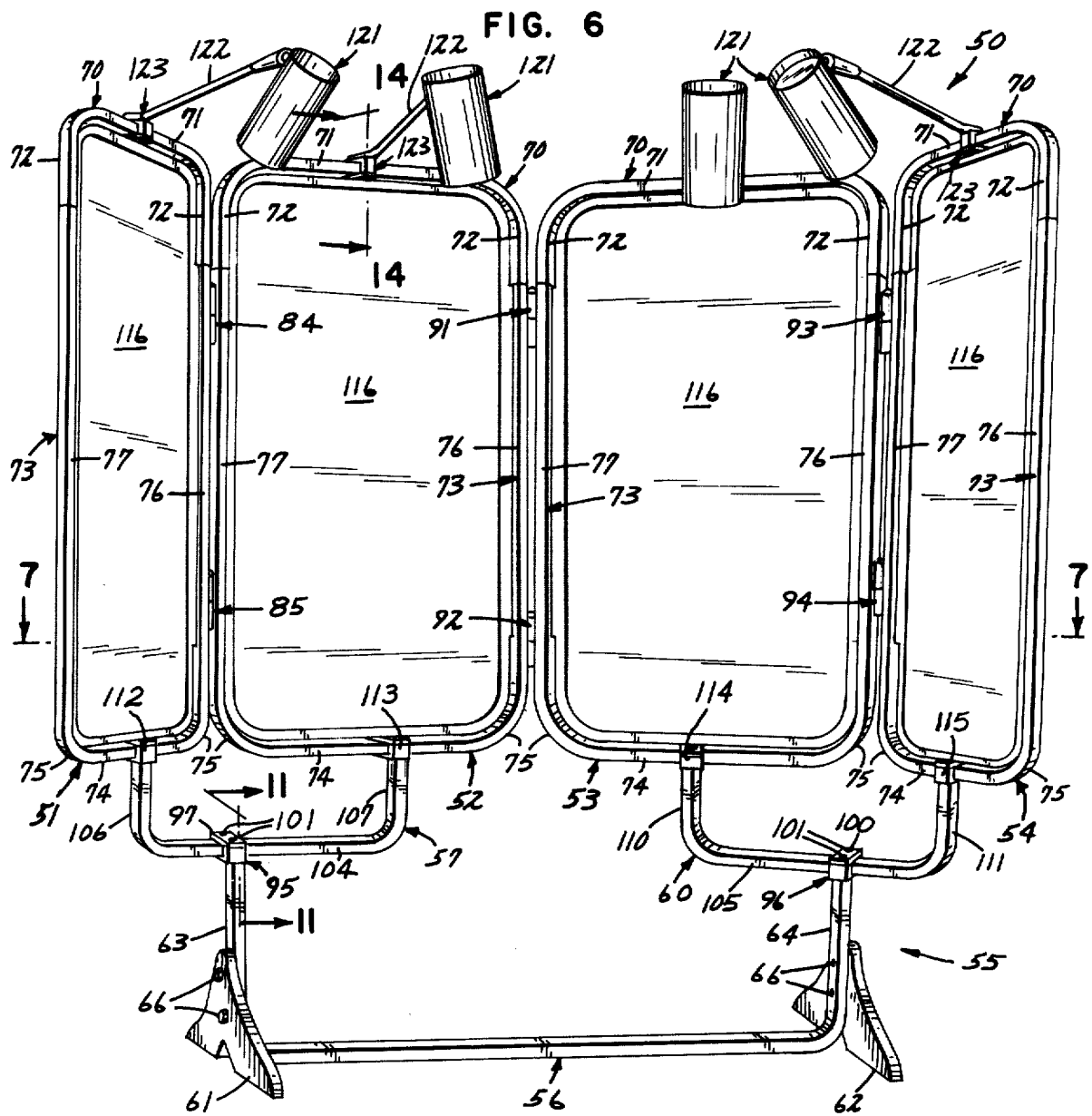
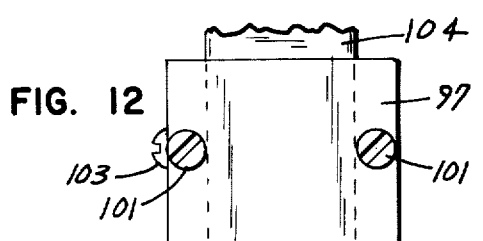
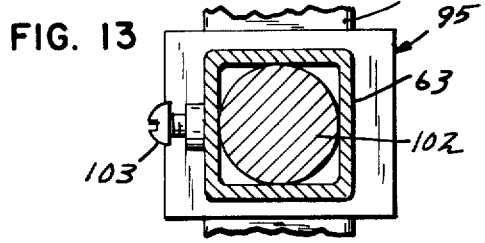
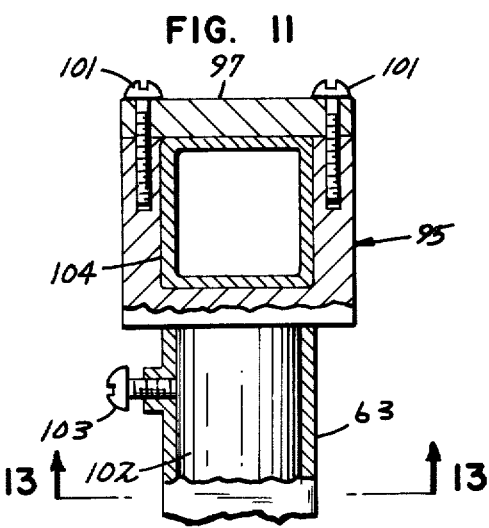

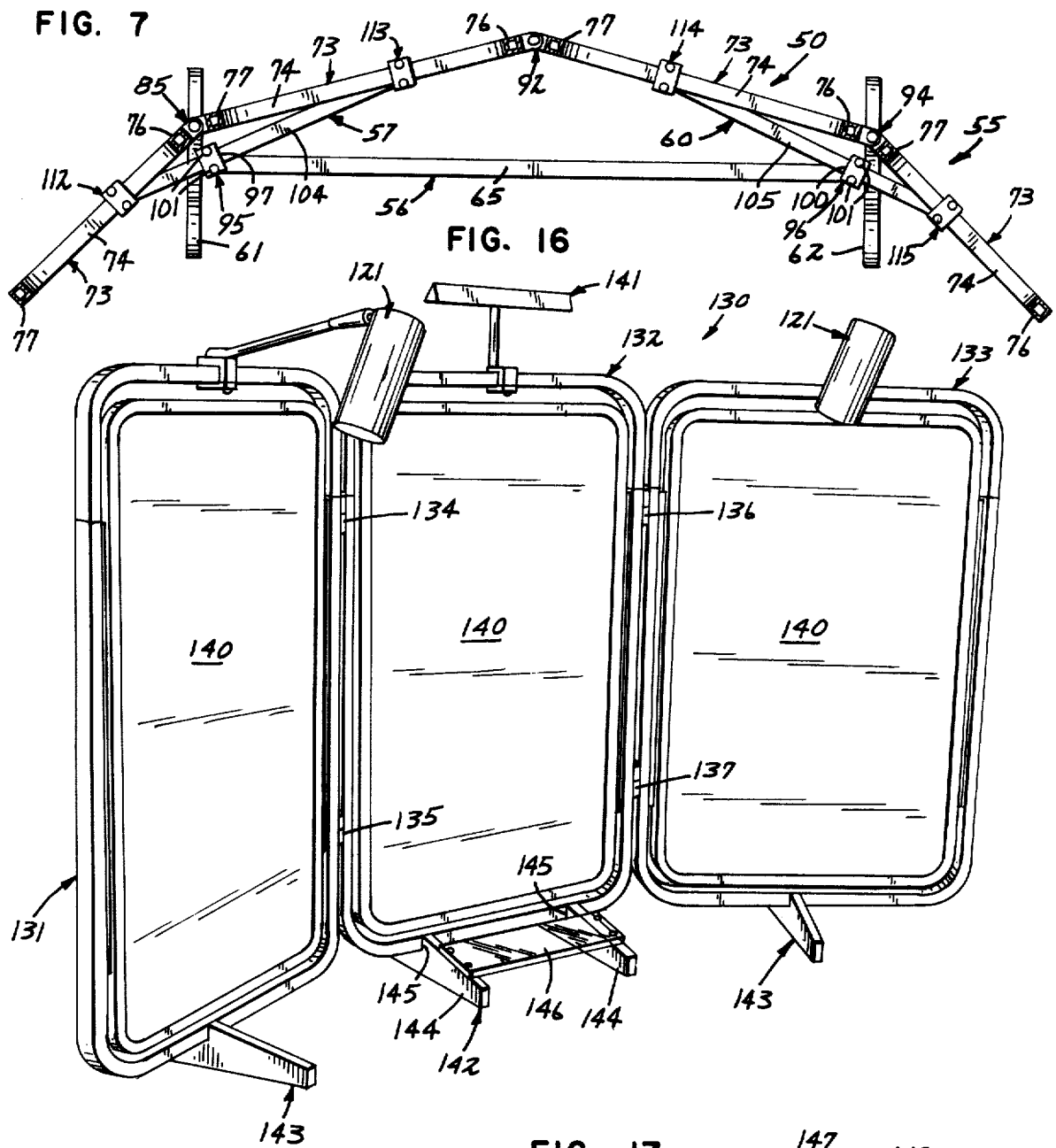
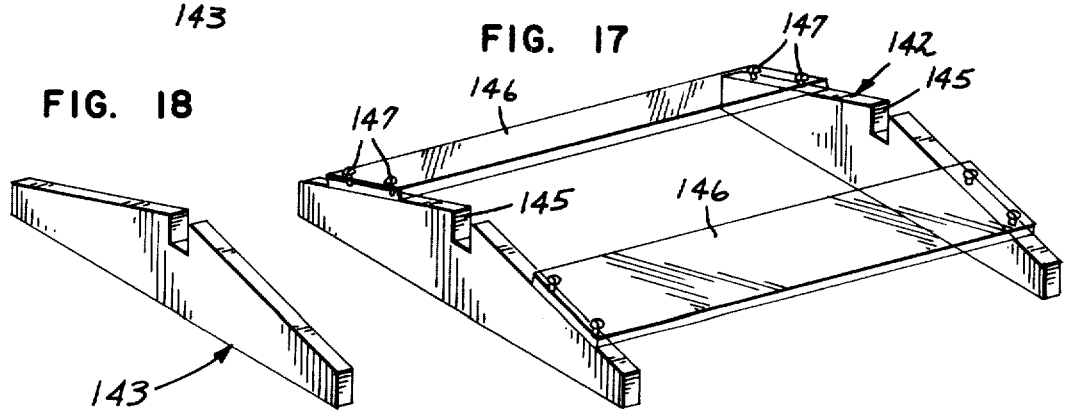

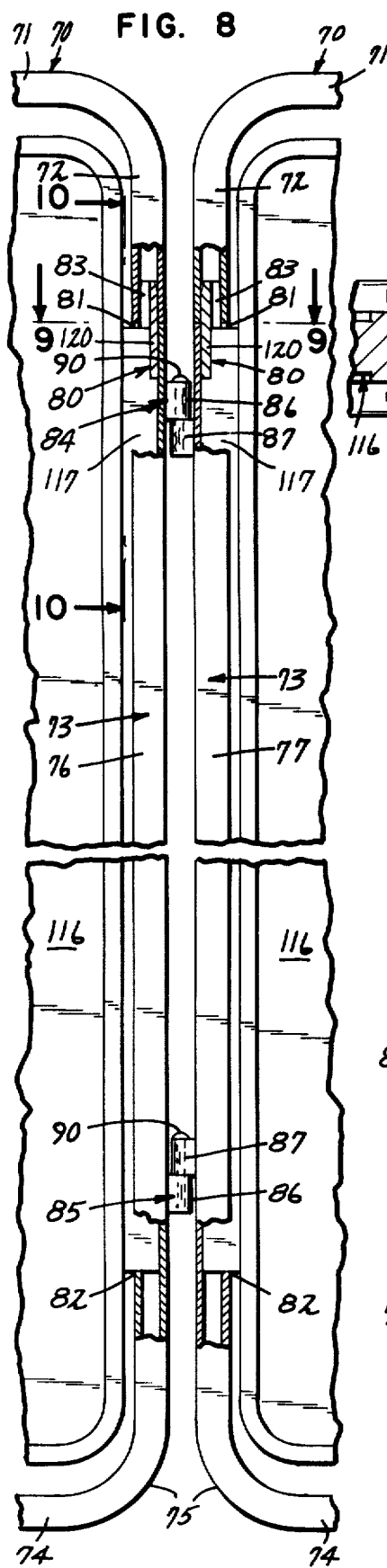
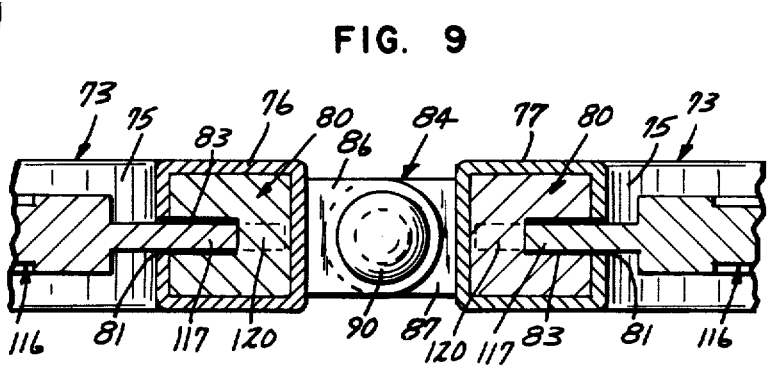
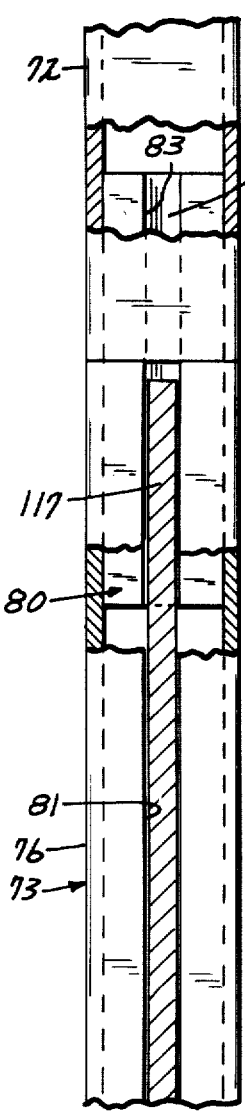
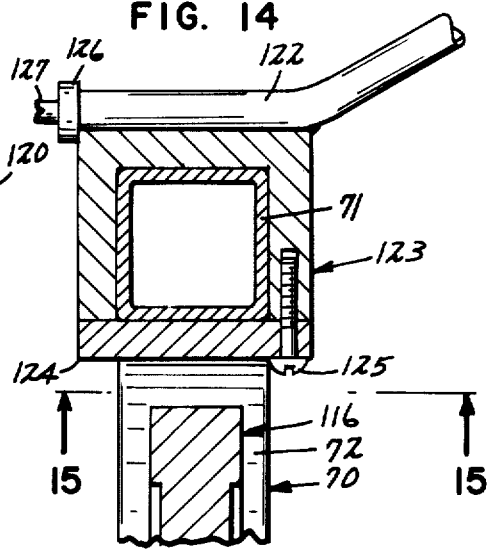
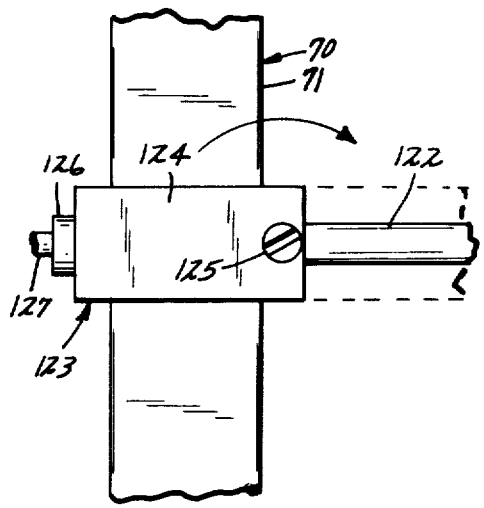

DISPLAY STRUCTURE

This application is a continuation-in-part of my copending application filed Aug. 25, 1978, Ser. No. 936,723. The copending application issued as U.S. Pat. No. 4,214,392 on July 29, 1980.

BACKGROUND OF THE INVENTION

This invention relates generally to display structures, and more particularly to such structures that include panels for educational or advertising purposes. The invention involves such structures that are free-standing, that may be knocked down to occupy a minimum of space for storage, that may be quickly and easily assembled and disassembled for shipment in a compact package, and in which displays may be quickly and easily changed when desired.

SUMMARY OF THE INVENTION

The display structure of this invention comprises frame means enclosing at least a pair of generally rectangular frames each defining a display area and each including a horizontal tubular top frame member having downturned opposite end portions with open lower ends and a U-shaped tubular bottom frame member having a horizontal bottom portion and a pair of laterally spaced, upturned side frame portions with open upper ends laterally spaced for alignment with said downturned portions. The end portions of one frame member include connector pins received in respective open ends of the other frame member, and the side frame portions have apposed longitudinaly slots to the interiors thereof. Display panels, each disposed in a different display area, have outwardly projecting mounting tabs at the opposite side edges thereof, the tabs being received in the slots of respective side frame portions and having lower ends engaging the lower ends of said slots to be supported thereby. Hinge means connect the frames for pivotal movement relative to each other on at least one vertical axis, and the display structure may further include tubular means for pivotably supporting said frames so as to enable the angular relation therebetween to be varied. The tubular means are preferably of rectangular cross section.

Embodiments of the invention having three and four display areas are specifically shown, and are provided with means for illuminating the display panels comprising lamp fixtures removably and slidably secured to the top frame members.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing,

FIG. 6 is a view in perspective of a second display structure provided in accordance with this invention;

FIG. 7 is a horizontal section taken along the line 7—7 of FIG. 6 with parts removed;

FIG. 8 is a fragmentary view in elevation of a hinged joint used in the structure of FIG. 6, to a larger scale, parts being broken away for clarity of illustration;

FIG. 9 is a fragmentary horizontal section along the line 9—9 of FIG. 8;

FIG. 10 is a fragmentary vertical section along the line 10—10 of FIG. 8;

FIG. 11 is an enlarged fragmentary vertical section taken along the line 11—11 of FIG. 6;

FIG. 12 is an enlarged fragmentary plan view of the structure of FIG. 11;

FIG. 13 is an enlarged horizontal section taken along line 13—13 of FIG. 11;

FIG. 14 is an enlarged fragmentary vertical section taken along the line 14—14 of FIG. 6;

FIG. 15 is an enlarged fragmentary bottom view of the structure of FIG. 14 as suggested by the line 15—15 in that figure;

FIG. 16 is a view in perspective of a third display structure provided in accordance with the invention; and FIGS. 17 and 18 show in perspective details of the structure of FIG. 16 to a larger scale.

DETAILED DESCRIPTION OF THE PREFERRED EMBODIMENTS

Figure 1:
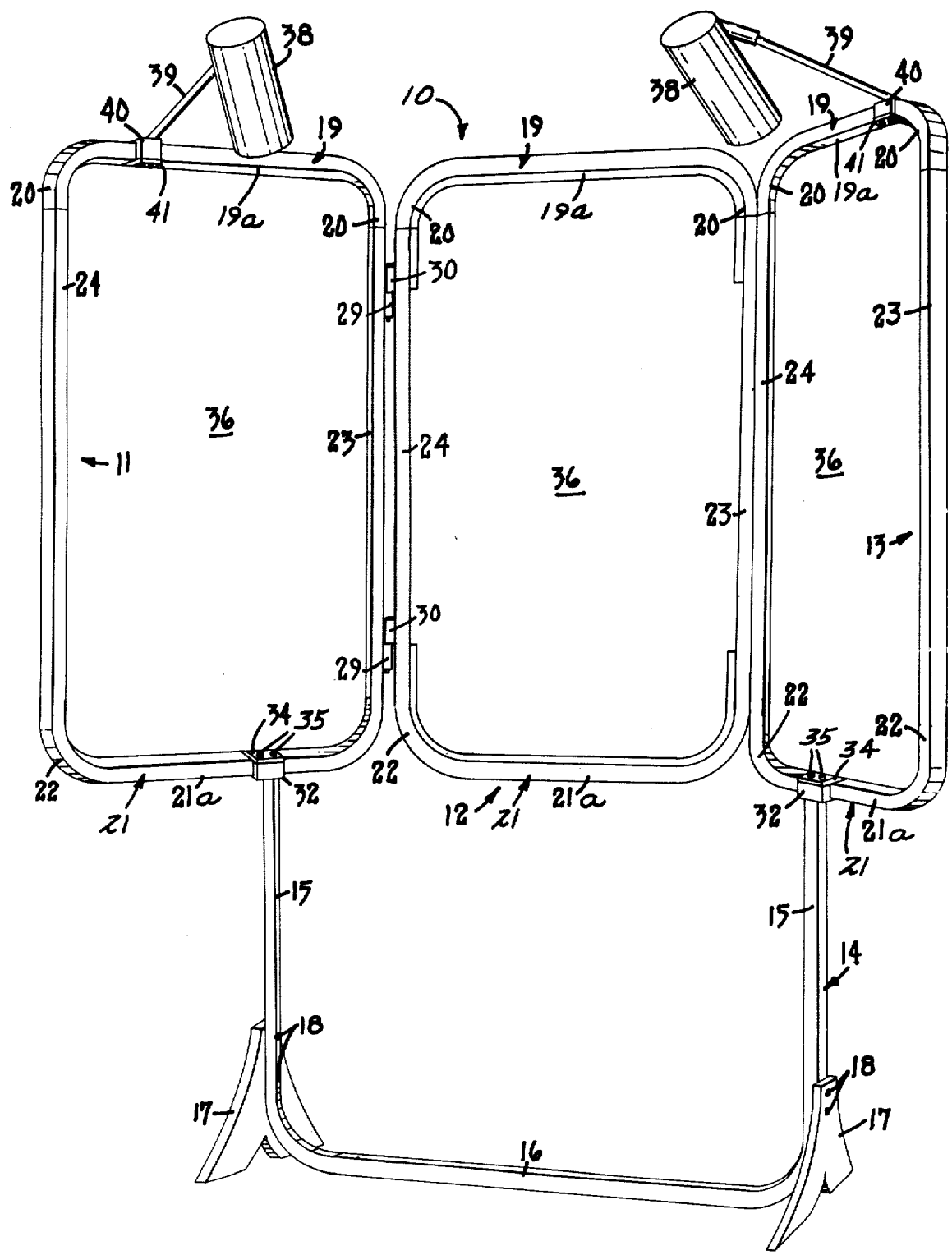
FIG. 1 is a view in perspective of a first display structure produced in accordance with this invention.

FIGS. 1-5 show a first display structure 10 produced in accordance with this invention. It comprises a plurality of generally rectangular frames 11, 12 and 13, that are supported in vertical positions by a generally U-shaped support 14 which includes a pair of vertical leg portions 15 extending upwardly from a bottom cross bar portion 16. A pair of foot implements 17 are secured to the leg portions 15 adjacent their lower ends, by screws or like fasteners 18. For the purpose of the present example, the frames 11, 12 and 13, as well as the support 14, are shown as being fabricated from cross-sectionally rectangular tubing, preferably of metal.

The frame 12 is shown in FIG. 1 as being a central frame, the frames 11 and 13 being disposed at opposite sides of the frame 12. Each of frames 11, 12 and 13 comprises a top frame member 19 including a horizontally disposed top frame portion 19a having downturned, laterally spaced opposite end portions 20, and a U-shaped bottom frame member 21 having a horizontally disposed bottom frame portion 21a bent upwardly as indicated at 22 to provide vertical side frame portions 23 and 24 laterally spaced by the same distance as end portions 20 of top frame member 19. The downturned end portions 20 have welded or otherwise rigidly secured therein connector pins 26 that are slidably received in the upper ends of the vertical portions 23, 24 of the bottom frames members 21.

Figure 3:
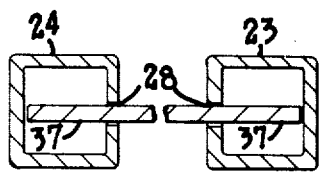
FIG. 3 is an enlarged horizontal section taken along the line 3—3 of FIG. 2.
Figure 4:
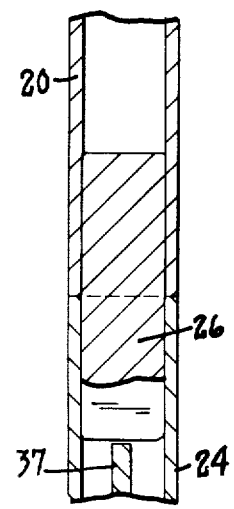
FIG. 4 is an enlarged fragmentary section taken along the line 4—4 of FIG. 2.

For the most part, the vertical frame portions 23, 24 are identical, the inner wall of each having a slot 28 therein that extends longitudinally for a substantial portion of the length thereof, the bottoms 27 of the slots being preferably above frame portions 21a by equal, substantial amounts. As shown in FIG. 3, the slots 28 of the frame portions 23 and 24 of frame 11 are apposed, for a purpose which will hereinafter become apparent. The same arrangement exists between the slots of the frame portions 23 and 24 of frames 12 and 13.

Frames 11 and 13 are pivotably connected to opposite sides of frame 12 by hinges including hinge elements 29 on frame portions 23, cooperating hinge elements 30 on frame portions 24, and loose hinge spindles 31. The hinges enable the frames 11, 12 and 13 to be disposed at various angles relative to each other. Since only frames 11 and 13 rest on support 14, hinge portions 30 in frame 13 are located to rest on hinge portions 29 of frames 11 and 13.

Figure 5:
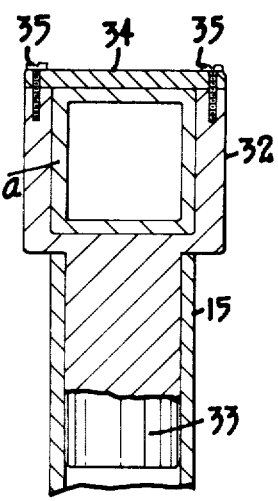
FIG. 5 is a further enlarged fragmentary section taken along the line 5—5 of FIG. 2.

A pair of generally U-shaped yokes 32 are provided with mounting stems or pins 33 that extend downwardly into the ends of the leg portions 15, the yokes 32 slidably receiving the bottom frame portions 21a, as shown in FIG. 5. Each of the yokes 32 is provided with a plate-like clamping member 34 which overlies the bottom frame portion 21a, and which is releasably secured to the yoke 32 by a set of clamping screws 35. For initially positioning the several frames 11, 12 and 13 at desired angular displacements with respect to one another, the clamping members 34 are loosened to permit sliding movements of the bottom frame portions 21a with respect to the yokes 32. When the desired positions of the several frames are established, the clamping screws 35 are tightened, so as to hold the frames in their desired angular relationships. With reference to FIG. 5, it is to be noted that the stems 33 are cylindrical in shape, so as to permit the yokes 32 to rotate with respect to the legs 15.

Figure 2:
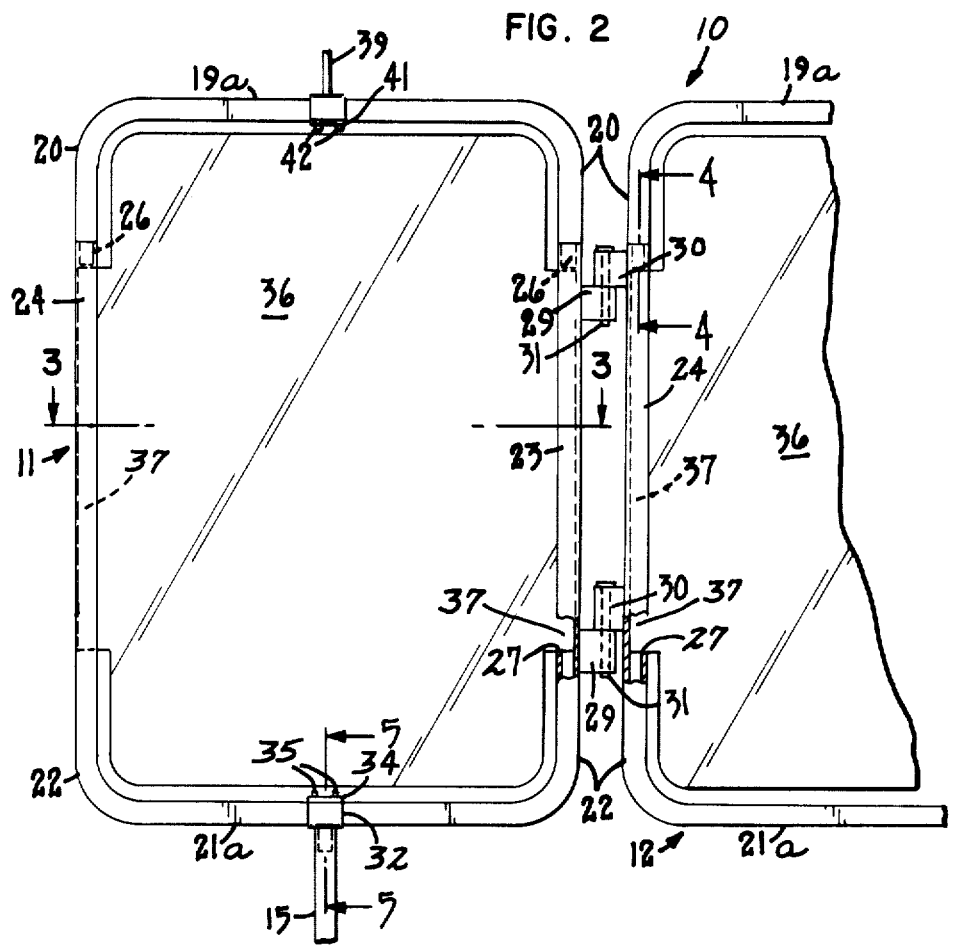
FIG. 2 is a fragmentary view in front elevation of a portion of the structure of FIG. 1.

Each of the frames 11, 12 and 13 supports a different one of a plurality of generally rectangular display panels 36 that are adapted to having printed or otherwise mounted thereon pictorial or printed matter, or any means of conveying a message, not shown. The panels 36 are formed to provide outwardly projecting tabs 37 at the opposite edges thereof, the tabs 37 being elongated in a vertical direction. The tabs 37 are adapted to project through the slots 28 in the vertical frame portions 23, 24, and have their lower ends resting on the bottom ends 27 of the slots 28, as is best shown in FIG. 2. The panels 36 are preferably rigid, the tabs 37 thereof being preferably of a thickness only slightly less than the width of the slots 28 in the vertical frame portions. When it is desired to mount a given panel 36 in its respective frame 11, 12 or 13, it is only necessary to remove the top frame member 19 from engagement with its respective vertical frame portions 23, 24, after which panel 36 may be positioned above the upper ends of the vertical frame portions, the tabs 37 aligned with their respective slots 28, and the panel 36 moved downwardly until the lower ends of the tabs 37 engage the lower ends 27 of the slots. With the panel 36 thus put in place, the top frame member is replaced on the upper ends of its respective vertical side frame portions 23, 24.

In FIGS. 1, a pair of lamp fixtures 38 of appropriate structure are shown as being provided with mounting arms 39, the lower ends of which are connected to yokes 40 similar to the yokes 32, slidably mounted on the top frame members 19. Yokes 40 are provided with clamping plates 41 and clamping screws 42, as described for yokes 32.

With the above-described arrangement, display panels 36 may be quickly and easily removed from their respective mounting frames and replaced by similar panels, without affecting the angular relation between the frames, and the entire structure may be quickly and easily assembled for use or disassembled for storage or shipment. By removing the spindles 31 from their respective hinge elements 29 and 30, by temporarily removing plates 34, 41, and by disconnecting the foot elements 17 from the support 14, the display structure may be boxed or crated so as to occupy a minimum space. Assembly or disassembly of the structure can be achieved in a few minutes time.

Although three panel supporting frames are shown as being mounted on the support 14, it will be appreciated that only a pair thereof may be hinged together and mounted on support 14, if desired.

FIGS. 6-14 show a second display structure 50 produced in accordance with this invention. It comprises four rectangular frames 51, 52, 53 and 54 that are supported in pairs, in vertical positions, by a support 55 including a generally U-shaped principal support 56, a pair of U-shaped secondary supports 57 and 60, and a pair of foot elements 61, 62. Support 56 includes a pair of leg portions 63, 64 that extend upward from a bottom cross bar not shown, and the foot elements are secured to the leg portions by fasteners 66. Frames 51, 52, 53 and 54 and supports 56, 57 and 60 are shown as being fabricated from cross-sectionally rectangular tubing, preferably of metal.

Frames 51 and 54 are shown in FIG. 6 as outer frames, and frames 52 and 53 as inner frames. Each of the frames comprises a top frame member 70 including a top frame portion 71, having downturned opposite end portions 72, and a U-shaped bottom frame member 73 including a horizontally disposed bottom frame portion 74 bent upward as indicated at 75 to provide laterally spaced vertical side frame portions 76, 77. Portions 76, 77 have welded or otherwise rigidly secured therein connector pins 80 that are slidably received in the lower ends of downturned portions 72 of top frame portion 71.

As in structure 10, the vertical frame portions 76 and 77 have slots 81 extending along their inner walls for a substantial portion of the length thereof, the bottoms 82 of the slots being spaced above the frame portions 74. The slots continue through pins 80, as shown at 83 in FIGS. 8-10, to depths less than the full inside dimension of portions 76 and 77.

Frames 51 and 52 are pivotably connected by hinges 84 and 85 including outer hinge elements 86 on frame portion 76, cooperating inner hinge elements 87 on frame portion 77, and loose hinge pintles 90, as shown in FIG. 8. The hinges enable frames 51 and 52 to be disposed at various angles relative to each other. Similar hinges 91, 92 are shown between frames 52 and 53, and hinges 93 and 94 are shown between frames 53 and 54, thus enabling relative angular relations between all the frames such as that shown in FIG. 7.

Support 65 is very similar to support 14 of FIG. 1, except that leg portions 63 and 64 are somewhat shorter: they carry at their upper ends yoke elements 95, 96 having plate-like clamp members 97 and 100 secured by pairs of clamping screws 101, and include cylindrical stems 102 to enable the yokes to rotate with respect to leg portions 63, 64, a locking screw 103 being in each case provided if desired.

Secondary supports 57 and 60 are of similar structure: they consist of bottom cross bar portions 104 and 105 adapted to be clamped in yokes 95 and 96 respectively, and have upturned leg portions 106, 107 and 110, 111 on which frames 51, 52, 53 and 54 are pivotally mounted by further pivoted yoke elements 112, 113, 114 and 115, all respectively, like those just described. It will be evident that by suitable sliding adjustments in the various yoke elements the frames can be brought to any desired angular relation within a wide range.

As in FIG. 1, each of frames 51-54 supports a different one of four generally rectangular rigid display panels 116. As suggested in FIGS. 8-10, panels 116 are formed to provide outwardly projecting tabs 117 at the opposite sides thereof, the tabs being elongated in a vertical direction. The tabs are adapted to project through the slots 81 in frame portions 76 and 77, and have their lower ends resting on the bottoms 82 of the slots. At their upper corners tabs 117 are cut away slightly, to engage the unslotted portions 120 of connection pins 80. Bottom frame members 73 are sufficiently resilient to spring slightly, in the absence of upper frame members 70, so that tabs 117 can slide past end portions 120 as panels 116 are inserted into the frame. Thus the panels are quite secure in the frames even before members 70 are replaced. As before, tabs 117 are of a thickness only slightly less that the width of slots 81 in the vertical frame portions.

In FIG. 6 a plurality of lamp fixtures 121 of appropriate structure are shown as being provided with hollow mounting arms 122, for mounting on frame portions 70 by yokes 123 to which they are secured as by welding. As shown in FIGS. 14 and 15, each yoke 123 may be closed at its bottom by a plate 124 pivoted about a fastener 125, to secure the yoke and light fixture at the top of the frame. Panels 116 are of height less than the inside height of frames 51-54 to enable this. Electrical energization for fixture 121 is supplied through mounting arms 122 and bushings 126 by suitable electric cords 127.

FIGS. 16-18 show a third display structure 130 produced in accordance with the invention. It comprises three rectangular frames 131, 132 and 133 like frames 51, 52 or 53, and 54 of FIG. 6, pivotably interconnected by hinges 134, 135 and 136, 137 like hinges 84, 85, and carrying panels 140 similarly constructed and mounted. Appropriate lamp fixtures 121 and 141 are also provided.

The third display structure is specifically intended to be mounted on a surface such as a table or desk rather than on a floor, and a simplified support structure for this purpose is shown to include a central support 142 and outer supports 143. Support 142 comprises a pair of feet 144 having central notches 145 sized to receive the rectangular metal frame 132, and interconnected by suitable panels 146 secured to feet 144 by fasteners 147. For convenience, supports 143 may comprise no more than duplicates of feet 144.

From the foregoing it will be evident that I have invented a display structure configuration by which a plurality of display panels are mounted and illuminated for effective presentation to observers, the structures being adapted for use with varying numbers of panels and for mounting either on a floor or a more elevated surface. The arrangement is easily dismantled into a small space for shipment, and quickly assembled for use with no more complicated tools needed than a screwdriver: once assembled the display panels are easily replaced when a change in subject matter to be displayed is desired.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A display structure comprising, in combination:
   a plurality of rectangular frames pivotally interconnected for angular relative movement about at least one vertical axis, said frames including horizontal bottom frame portions;
   a primary U-shaped support;
   a secondary U-shaped support having a horizontal bottom portion;
   means pivoted in an end of said primary support and slidable along said horizontal portion of said secondary support; and
   means pivoted in ends of said secondary support and slidable along said horizontal bottom frame portions, whereby said frames are mounted on said supports in angularly adjustable mutual relation.

2. A display structure comprising, in combination:
   a plurality of rectangular frames pivotally interconnected for angular relative movement about at least one vertical axis, said frames including horizontal bottom frame portions;
   a generally U-shaped support; and
   means for mounting said frames on said support in angularly adjustable mutual relation, said mounting means including a plurality of secondary U-shaped supports having horizontal bottom portions, means pivoted in the ends of the first-named U-shaped support and slidable along said horizontal portions of said secondary supports, and means pivoted in the ends of said secondary supports and slidable along said horizontal bottom frame portions.

* * * * *